United States Patent [19]

Martin

[11] 4,270,261
[45] Jun. 2, 1981

[54] METHOD OF FORMING FIXING HEADS ON TENSION SPRINGS AND TENSION SPRINGS MANUFACTURED BY THIS METHOD

[75] Inventor: Johann Martin, Bielhausen, Fed. Rep. of Germany

[73] Assignee: U.S. Philips Corporation, New York, N.Y.

[21] Appl. No.: 34,524

[22] Filed: Apr. 30, 1979

[30] Foreign Application Priority Data

May 5, 1978 [DE] Fed. Rep. of Germany ....... 2819700

[51] Int. Cl.³ .................... B22D 19/90; F16F 9/54
[52] U.S. Cl. .................... 29/527.2; 29/414; 267/179
[58] Field of Search .............. 29/163, 414, 527.1, 29/527.2; 267/166, 179, 151, 152; 403/229, 269; 164/111; 264/271, 274, 145

[56] References Cited

U.S. PATENT DOCUMENTS

| 2,113,674 | 4/1938 | Brickman et al. | 29/414 |
| 2,200,633 | 5/1940 | Morin et al. | 164/111 X |
| 2,484,485 | 10/1949 | Brickman | 403/269 |
| 4,027,501 | 5/1977 | Hanebuth | 29/527.1 |

FOREIGN PATENT DOCUMENTS

| 503791 | 7/1930 | Fed. Rep. of Germany | 267/179 |
| 1391845 | 2/1965 | France | 267/179 |

*Primary Examiner*—Gil Weidenfeld
*Assistant Examiner*—K. J. Ramsey
*Attorney, Agent, or Firm*—David R. Treacy

[57] ABSTRACT

A method of forming fixing heads on both ends of tension springs which are made from coiled spring wire, in particular for precision apparatus. A continuous coil of spring wire is expanded over at least two turns at the area of the ends to be formed. The expanded turns are provided with an envelope of a synthetic material by molding.

6 Claims, 8 Drawing Figures

METHOD OF FORMING FIXING HEADS ON TENSION SPRINGS AND TENSION SPRINGS MANUFACTURED BY THIS METHOD

BACKGROUND OF THE INVENTION

The invention relates to a method of forming fixing heads on both ends of tension springs which are formed from coiled spring wire.

Many apparatus, in particular precision apparatus, require large numbers of tension springs whose ends are provided with eyelets. The eyelets are hooked onto fixing hooks and the like. During mounting, the springs are held by means of tweezers and first one eyelet is hooked into the appropriate fixing position, after which the spring is expanded and the other eyelet is hooked into the corresponding fixing position. This is an extremely time-consuming procedure. Moreover, there is a drawback in that the springs often escape from the tweezers during the hooking procedure and are catapulted far away. A further drawback consists in that the spring wire is greatly deformed by bending prior to the formation of an eyelet. This deformation often causes breaking of the spring wire at the area of deformation.

It is known (from U.S. Pat. No. 3,804,396) to form fixing heads on the expanded ends of a tension spring made of coiled spring wire. However, the nature of the formation of the heads is not accurately disclosed. Besides the fact that the tension springs provided with fixing heads in accordance with that United States Patent are straightened at their ends for the formation of the fixing heads so that they are susceptible to breaking, the described tension springs are used for safety belt fixings, so that they consist of an essentially thicker plastically deformable wire having a diameter in the order of magnitude of about 5 mm. The wire thicknesses used for precision mechanics are in order of magnitude of up to 0.8 mm.

SUMMARY OF THE INVENTION

The invention has for its object to provide a method of forming fixing heads on tension springs, made of coiled spring wire, which are resistant to breaking and which are above all suitable for automatic mounting.

This object is achieved by a method in accordance with the invention, in which a continuous coil of the spring wire is expanded at the area of the ends to be formed, the expansion extending over at least two turns, the expanded turns being enveloped by a synthetic material by molding.

According to one aspect of the method in accordance with the invention, after the expansion of the turns the spring wire is retained on both sides of the center of expansion and is cut at this center, after which at least the expanded turns adjoining the area of the cut are enveloped by a synthetic material by molding, a bridge of synthetic material which interconnects the separated wires ends being formed at the same time.

In fixing heads thus manufactured, the spring wire is deformed so little at the area of the spring heads that there is no longer a risk breaking. The method is also suitable for the manufacture of endless chains of tension springs in which successive pairs of fixing heads are interconnected. As desired, the heads may be directly separated from each other or the springs may be applied as an endless belt or chain to a mounting machine which separates the individual tension springs immediately prior to mounting.

According to other embodiments of the invention, the fixing heads may be shaped as a ball, cone or an eyelet. The shaping of the heads is selected for the relevant application.

The method in accordance with the invention will be described in detail hereinafter with reference to the steps shown in the Figures.

DESCRIPTION OF THE PREFERRED EMBODIMENTS

The inventive method of forming fixing heads on tension springs is of greatest advantage in the manufacture of tension springs for precision apparatus where the thickness of the wire is in the order of magnitude of up to 0.8 mm, and the wire is provided as a continuous coil 1 of spring wire. At the area where the fixing heads are to be provided, the coil 1 is first expanded, the coil portions 1a and 1b being engaged and pulled apart, for example, by means of clamping tools such as pliers 3 which are denoted by broken lines. The pliers 3 expand, for example, four turns of the wire coil. It may also be sufficient to expand only two turns; alternatively, the expansion of more than four turns is also feasible if desired.

Figure 1:
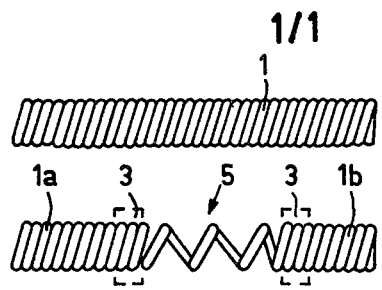
FIG. 1 is a side view of a continuous coil of spring wire.
Figure 2:
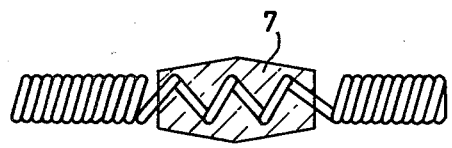
FIG. 2 shows the coil of FIG. 1 with an expansion zone which extends over four turns.
Figure 3:
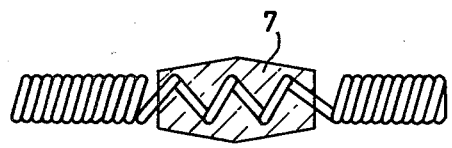
FIG. 3 shows the coil of FIG. 2 after enveloping of the expansion zone by a synthetic material.
Figure 4:
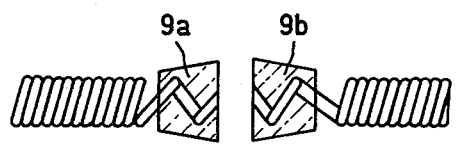
FIG. 4 shows cutting of the envelope of synthetic material at the center of expansion, two conical fixing heads thus being formed, FIG. 5 again shows an expansion zone which extends over four turns, the wire coil being retained on both sides of the expansion zone by means of clamping tools.

According to a first embodiment, the expansion zone 5 is subsequently provided with an envelope 7 of a synthetic material by molding as shown in FIG. 3, the form of the envelope being such that there are two truncated cones situated one against the other at their largest cone diameter. After molding, the fixing heads 9a and 9b thus formed can be separated as desired by means of a cutting tool. FIG. 4 shows the appearance of the fixing heads after the separation.

Figure 5:
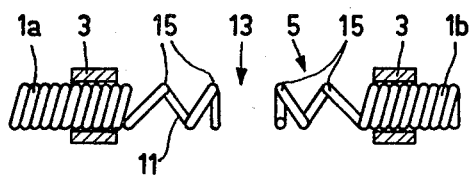
Figure 6:
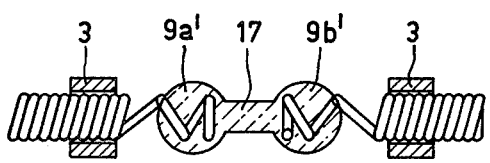
FIG. 6 shows the coil of FIG. 5 after enveloping of the expansion zone to form two spherical fixing heads which are interconnected by a bridge of synthetic material, the spring wire having been cut in advance at the area of the center of the expansion zone.
Figure 7:
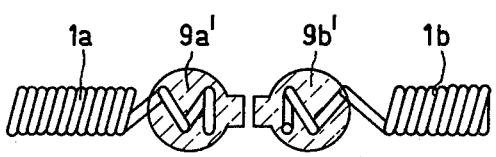
FIG. 7 shows the spherical fixing heads separated from each other.
Figure 8:
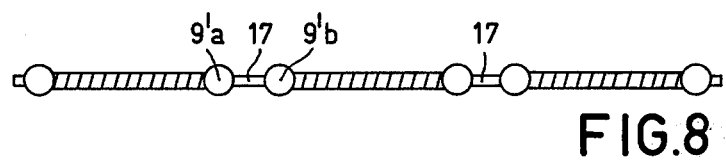
FIG. 8 shows a chain of tension springs, in which the adjoining spherical heads have not yet been separated.

FIGS. 5 to 7 show a second preferred embodiment of the method in accordance with the invention. After the expansion of the coiled wire spring by means of the pliers 3, the pliers 3 continue to engage the coil portions 1a and 1b. The coil portions 1a and 1b are thus further retained by the pliers 3. The spring wire 11 is then cut at the center of expansion 13. At the area of the cut, the slightly spaced, expanded turns 15 are then freely suspended one opposite the other. As is shown in FIG. 6, an envelope is then provided by molding, i.e. a spherical envelope, the two expanded turns 15 each being enclosed in a fixing head 9a', 9b'. Molding is effected so that a bridge 17 of synthetic material remains between the heads 9a' and 9b'. This bridge 17 can be cut at a later stage as shown in FIG. 7.

The formation of conical fixing heads as shown in FIG. 3 as well as spherical fixing heads as shown in FIG. 6 allows the formation of endless chains of tension springs when separation is omitted; these chains can be supplied to the mounting site where automatic mounting can take place. It is also clear that the fixing heads may have different shapes, for example, the shape of an eyelet as in conventional tension springs. It is merely necessary for the synthetic material to be adequately tough and strong.

What is claimed is:

1. A method of forming a respective fixing head on an end each of two tension springs formed from a continuous coil of spring wire, comprising expanding the coil over at least two turns at an area where two ends are to be formed, and molding a mass of synthetic material about said at least two turns.

2. A method as claimed in claim 1 comprising in addition after the expanding step, cutting the coil at approximately the center of the area of expansion, then holding the coil length at locations to each side of the expanded area in such a position that the cut ends are spaced from each other, and then molding said mass so as to form a bridge of synthetic material interconnecting the two fixing heads.

3. A method of mounting tension springs, comprising forming a continuous chain of tension springs having interconnected heads by the method of claim 1 or claim 2, supplying said chain to the site of mounting, and separating individual springs immediately prior to mounting.

4. A chain of tension springs, each spring having a synthetic material fixing head enveloping the respective spring ends, adjoining ends of successive springs being interconnected by bridges of synthetic material, said fixing heads and bridges being molded over and between said spring ends.

5. A chain as claimed in claim 4 wherein each of said heads is formed as a ball.

6. A chain as claimed in claim 4 wherein each of said heads is formed as a cone.

* * * * *